(12) United States Patent
Janssen

(10) Patent No.: US 6,667,665 B2
(45) Date of Patent: Dec. 23, 2003

(54) RANDOM NUMBER GENERATOR

(75) Inventor: Norbert Janssen, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/208,468

(22) Filed: Jul. 29, 2002

(65) Prior Publication Data

US 2003/0006849 A1 Jan. 9, 2003

Related U.S. Application Data

(63) Continuation of application No. PCT/DE01/00111, filed on Jan. 12, 2001.

(30) Foreign Application Priority Data

Jan. 27, 2000 (DE) .......................................... 100 03 472

(51) Int. Cl.$^7$ .............................................. H03B 29/00
(52) U.S. Cl. ........................... 331/78; 331/46; 708/250; 708/251; 714/739; 327/164
(58) Field of Search ............................. 327/164; 331/78, 331/46, 47, 50; 708/250, 251; 714/739

(56) References Cited

U.S. PATENT DOCUMENTS

| | | | |
|---|---|---|---|
| 4,810,975 A | 3/1989 | Dias | 331/78 |
| 4,905,176 A | * 2/1990 | Schulz | 708/252 |
| 5,010,331 A | 4/1991 | Dias et al. | 340/5.28 |
| 5,394,405 A | 2/1995 | Savir | 714/739 |
| 5,859,450 A | 1/1999 | Clark et al. | 257/233 |

FOREIGN PATENT DOCUMENTS

| | | |
|---|---|---|
| DE | 279 763 A1 | 6/1990 |
| DE | 196 18 098 C1 | 6/1997 |

OTHER PUBLICATIONS

Murry, H. F.: "A General Approach for Generating Natural Random Variables", IEEE, Dec. 1970, pp. 1210–1213.

Author not listed: "Integrated Circuit Compatible Random Number Generator", IBM Technical Disclosure Bulletin, vol. 30, No. 11, Apr. 1988, pp. 333–335.

Petrie, C. S. et al.: "Modeling and Simulation of Oscillator-Based Random Number Generators", IEEE, 1996, pp. 324–327.

Shannon, C.E.: "A Mathematical Theory of Communication", The Bell System Technical Journal, vol. 27, 1948, pp. 1–55.

* cited by examiner

*Primary Examiner*—Arnold Kinkead
(74) *Attorney, Agent, or Firm*—Laurence A. Greenberg; Werner H. Stemer; Ralph E. Locher

(57) ABSTRACT

A random number generator on an integrated circuit has a first clock generator circuit with a first voltage supply for generating a first signal of a first frequency or of a first frequency range. A second clock generator circuit has a second voltage supply for generating a second signal of a second frequency or of a second frequency range, such that the second frequency or a mean value of the second frequency range is lower than the first frequency. A generator samples the first signal with the second signal and generates at least one random number in dependence on the result of the sampling. The clock generator circuits are located as far away from one another as possible on the integrated circuit and/or the two voltage supplies are isolated from one another and/or at least one guard ring is placed around each of the clock generator circuits.

19 Claims, 2 Drawing Sheets

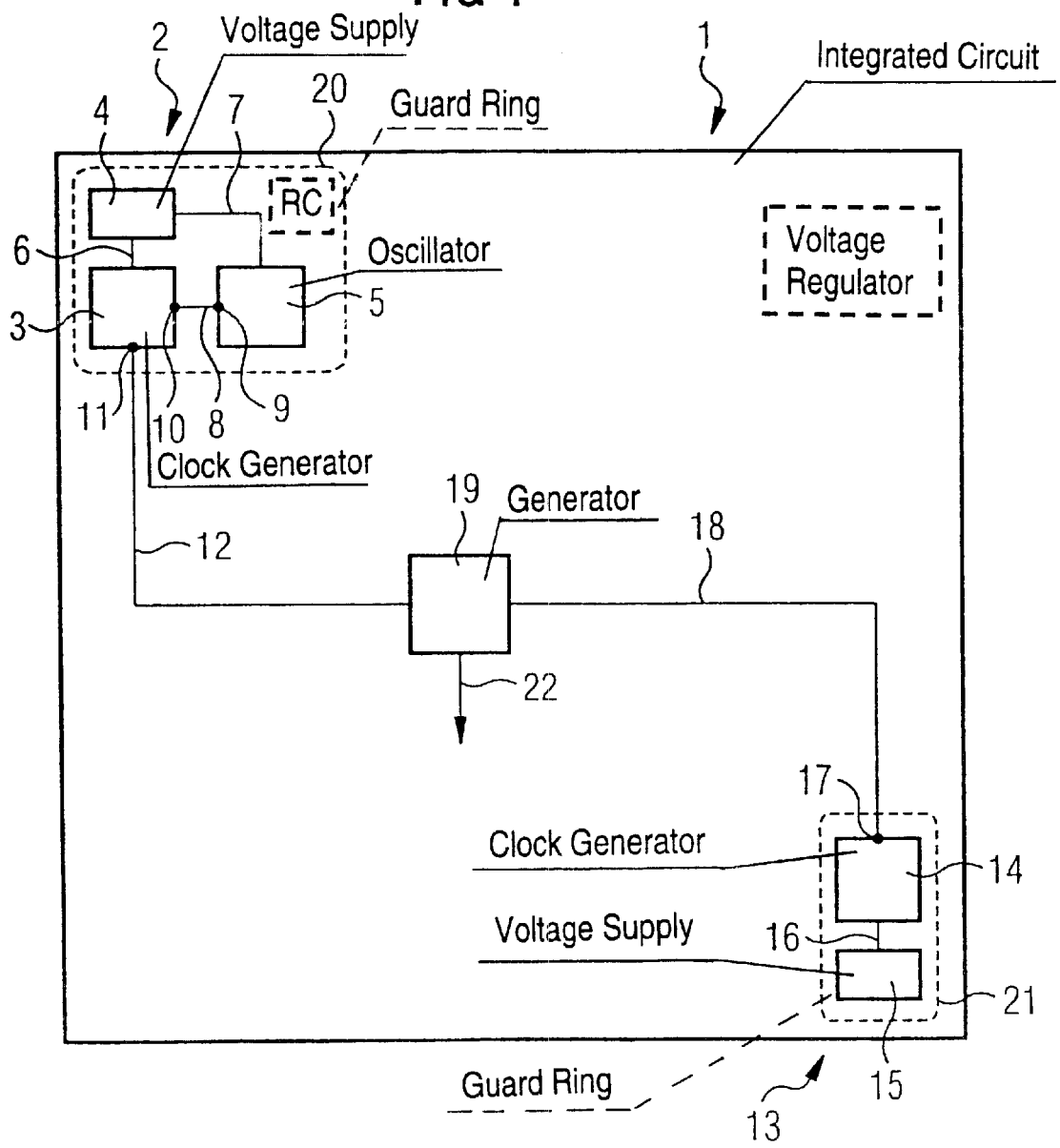

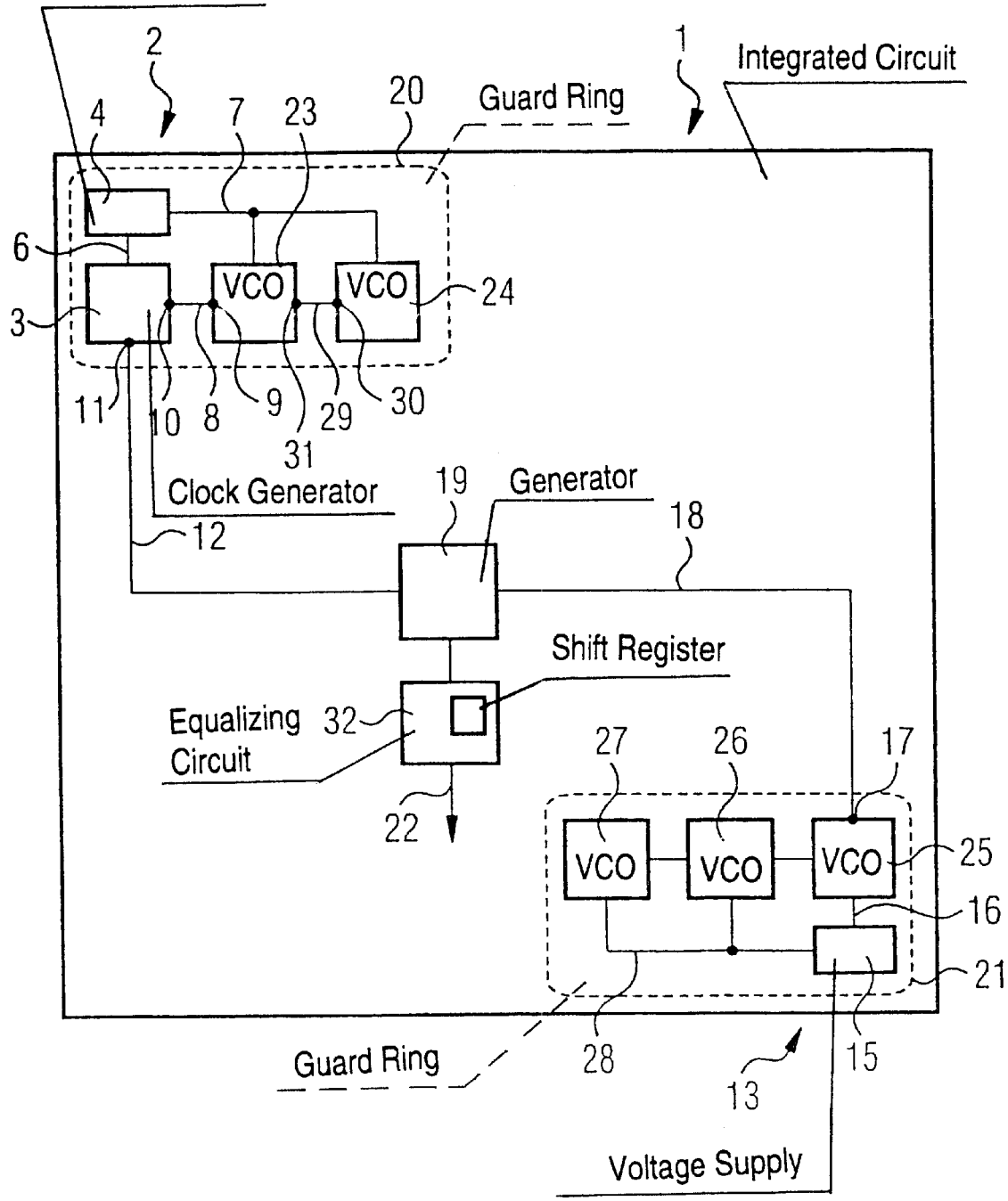

RANDOM NUMBER GENERATOR

CROSS-REFERENCE TO RELATED APPLICATION

This application is a continuation of copending International Application No. PCT/DE01/00111, filed Jan. 12, 2001, which designated the United States and was not published in English.

BACKGROUND OF THE INVENTION

1. Field of the Invention

The present invention relates to a circuit configuration for generating random numbers, and relates in particular the layout of the circuit for a random number generator on an integrated circuit.

The generation of random numbers is of great importance for many areas of science and technology. Thus, random numbers are required for numerous applications in statistics as well as for cryptographic purposes. It is precisely cryptography that is increasingly gaining in importance in the course of the propagation of data networks and the associated security problems. Therefore, the automatic generation of random numbers constitutes an important area in electrical engineering and electronics, especially in data processing. Not only the generation of random numbers but also the quality thereof is important. Not all methods can generate random numbers which are equally "random". Rather, it is usually possible, precisely when analyzing a large number of random numbers which have been generated by a specific random number generator, to identify patterns which lead to a deviation from the ideal, random distribution of the generated numbers. A measure of the quality of random numbers is their entropy, as described by Shannon-in "A Mathematical Theory of Communication", The Bell System Technical Journal, vol. 27, p. 379 (1948).

A method of generating random numbers which is known in the prior art is done by sampling a signal having a high frequency with a second signal having a significantly lower frequency. These signals are thus voltages which are present at specific outputs and oscillate back and forth between two amplitude values and do this at a specific rate in the temporal profile. The sampling is effected in a special circuit into which both signals are fed. In this case, a specific point in the wave profile of the second signal is always used in order to determine an instant at which the first signal is sampled, that is to say the value of the signal (for example measured as voltage) is ascertained and converted into a numerical value.

In digital circuits, these are in the simplest case the values zero or one, for example as "one" if, at the sampling instant, the wave course of the first signal is situated above the mean value (for example 0 volts), and as "zero" if the wave course is situated below the mean value. However, it is equally possible to make continuous interpretation of the value obtained in order thus to obtain an analog number (for example a voltage in millivolts which is converted 1:1 as number).

In the case of ideal wave courses of the two signals, it would be possible to observe a periodicity in the sampling of the amplitude values, which results from the ratio of the two frequencies. Consequently, it would not be possible to generate genuine random numbers with the aid of such a random number generator. In practice, however, the waves of the two signals are not ideal wave courses, rather, precisely in the microelectronic field, an inaccuracy is generated in the wave course due to an unavoidable noise. This can have the effect that a well functioning random number generator could be achieved with as few as two simple predetermined frequencies, if the signals were independent of one another.

In practice, however, such a simple random number generator does not satisfy the high requirements made of the quality of the random number to be generated. This is because it is of essential importance for the quality of the random numbers that the two signals are independent of one another. This means that one signal does not lead to influencing of the other signal through electrical signal paths situated in the circuit used, so that the two signals are coupled to one another in a specific manner.

In so-called physical noise generators which correspond to the above principle, an attempt is made to solve this problem of the-independence of the two signals for example-by virtue of the signal to be sampled, that is to say the first signal, having a non-constant frequency. Such a signal to be sampled can be obtained for example by integrating into the circuit for generating the random numbers a so-called voltage-coupled oscillator (voltage controlled oscillator, VCO) whose control input is fed by a periodically varying signal, as is provided by a second oscillator, for example. As a result, this has the effect that the frequency of the signal of the VCO is modulated in a manner dependent on the wave course of the second oscillator. In this case, the second oscillator may also be a VCO which is operated with a constant voltage for example at its control input, so that an oscillation signal having a constant frequency is output at its signal output. However, this approach, too, has still not led to satisfactory results for all areas of use. As a result, it can happen that the two signals are temporarily coupled, so that a mixed frequency is formed provided that the frequency of the first signal is suitable for such coupling at a specific point in time and the two signals diverge from one another again after a specific time. As a result, the quality of the random numbers provided by the circuit fluctuates with the varying frequency of the first signal. Consequently, there is still a need for random number generators in which the quality of the random numbers generated is better.

German Patent No. DD 279 763 A1 describes a method for generating random numbers in microcomputers, in which two non-correlated electrical oscillations are utilized whose frequencies differ at least by the factor 100. The oscillations are generated by two independent sources, to be precise in such a way that there is correlation neither between the frequencies nor between the phase angles of the two oscillations. The oscillations of the higher frequency are counted by a counter started by a microcomputer, and the oscillation of the lower frequency is utilized to stop the counter. The random number is then available, after the stopping of the counter, as counter reading for further processing.

U.S. Pat. No. 5,859,450 describes a guard ring which is provided for reducing the dark current of a photodiode. What is involved in this case is an annular highly doped region in semiconductor material, which, according to the description in column 4 of U.S. Pat. No. 5,859,540, changes the position of the depletion zone and thus reduces the dark current. A guard ring is generally a doped region in semiconductor material which surrounds a component for the purpose of current delimitation.

SUMMARY OF THE INVENTION

It is accordingly an object of the invention to provide a random number generator which overcomes the abovementioned disadvantages of the heretofore-known random number generators of this general type and which provides an improved independence of the two signals.

With the foregoing and other objects in view there is provided, in accordance with the invention, a circuit configuration, including:

an integrated circuit;

a random number generator configuration provided on the integrated circuit;

the random number generator configuration including a first clock generator circuit for generating a first signal having one of a first frequency and a first frequency range with a first mean value, and the random number generator configuration including a second clock generator circuit for generating a second signal having one of a second frequency and a second frequency range with a second mean value, the first and second clock generator circuits generating the first and second signals such that one of the second frequency and the second mean value is smaller than one of the first frequency and the first mean value;

the first clock generator circuit having a first voltage supply, the second clock generator circuit having a second voltage supply;

the random number generator configuration including a generator configured to sample the first signal with the second signal and configured to generate at least one random number in dependence of a sampling result; and the random number generator configuration having at least one isolation measure selected from the group consisting of the first and second generator circuits being spaced apart from one another by a maximum spacing distance on the integrated circuit, the first and second voltage supplies being isolated from one another, and at least one guard ring being placed around each of the first and second clock generator circuits.

The present invention is based on the principle of providing a series of measures which, individually or in combination, can decisively improve the independence of the two signals of the random number generator.

In other words, the invention is therefore generally directed at a random number generator on an integrated circuit having a first clock generator circuit having a first voltage supply for generating a first signal of a first frequency or of a first frequency range, a second clock generator circuit having a second voltage supply for generating a second signal of a second frequency and of a second frequency range, which or whose mean value is lower than the first frequency, and a generator, in which the first signal can be sampled by the second signal and which can generate at least one random number in a manner dependent on the result of the sampling, characterized in that the clock generator circuits are disposed as far away from one another as possible on the integrated circuit and/or the two voltage supplies are isolated from one another and/or at least one guard ring is placed around each of the clock generator circuits.

The first clock generator circuit, which supplies the signal to be sampled, can thus either generate a fixed frequency or output a variable frequency which varies in a predetermined frequency range. The simplest case of a fixed frequency has already been described above as prior art and is based on the principle that random numbers can nevertheless be generated as a result of unavoidable noise within the components. The use of a complete frequency range, that is to say the outputting of a signal having a variable frequency as such, is current state of the art.

The same applies to the second clock generator circuit. While the latter is usually of fixed frequency, it may equally be possible also to configure the second signal of variable frequency with a specific frequency range. In this case, the number of random numbers generated per unit time can fluctuate with the frequency of the second signal. However, this configuration may have the advantage of improving the quality of the random numbers.

As outlined above, the generator generates random numbers through evaluation of the temporal profiles and values of the two signals. In the simplest case, the generator may be a flip-flop into whose input the first signal is fed and whose output is always connected up to a new value when, for example, the second signal present at a control input has a rising edge. Corresponding realizations of such a circuit are familiar to the person skilled in the art.

Separating the two clock generator circuits on the integrated circuit by the maximum possible distance has the effect that the influence of the two signals on one another decreases with distance. Depending on the size of the entire integrated circuit, it is thereby possible to obtain a result of varying quality. In this case, "as far away from one another as possible" or "maximum spacing distance" is to be understood to mean that the components which form the two clock generator circuits, taking account of other circuitry conditions of the integrated circuit, lie at an extremely large distance from one another, for example in diagonally opposite corners of the integrated circuit.

Isolating the voltage supplies in accordance with the invention has the effect that the signal cannot bring about a crosstalk behavior onto the electric currents of the voltage supply, which represents a customary path for the coupling of the frequencies of the two signals.

Finally, guard rings likewise help to prevent the propagation of the signals via the integrated circuit.

In particular, it is preferred for two or even all three of the measures proposed to be realized simultaneously in a random number generator on an integrated circuit according to the present invention. All of the measures contribute to improving the independence of the signals.

The voltage supplies may preferably be isolated through the use of at least one RC element. RC elements are assemblies which allow only signals in a specific narrow frequency range to pass through and block other frequencies. Consequently, it is possible to select an RC element which can impede the other signal, which, after all, has a different frequency, effectively at the entry into the respective other clock generator circuit. It is also possible to dimension the RC element such that it prevents the exit of the signal from the clock generator circuit. If the output frequency is a variable frequency, it is appropriate to select the RC element such that the mean value of the frequencies present is transmitted. While it may be sufficient to use an RC element which filters one of the voltage supplies, preferably an RC element may in each case be provided for each of the clock generator circuits, and isolates the latter.

As an alternative or in addition to the use of RC elements, it may also be possible for the voltage supplies to be isolated through the use of at least one voltage regulator. In this case, then, both clock generator circuits may firstly be supplied by a common voltage supply, but the latter is passed via a respective voltage regulator which, due to its configuration, likewise enables separation of the signals.

The invention may be characterized in that the first signal has a variable frequency, or in that the second signal has a variable frequency. As already explained above, this relates to the possibility of allowing the frequency to change periodically by using corresponding components.

As already stated in-the explanation of the prior art, it is advantageous that the frequency of the second signal is significantly lower than the frequency of the first signal. In particular, it is preferred for the second signal to have a frequency which is at-least ten times lower than the frequency of the first signal, particularly preferably at least one hundred times lower than the frequency of the first signal.

The selection of the frequencies makes it possible to obtain a so-called jitter (variation of the temporal occurrence of a specific signal state) for the second signal, which covers a plurality of oscillations of the first signal, so that more random sampling of the first signal is possible.

The generator generates at least one random number. However, since the clock generator circuits supply a continuous signal, it is appropriate and preferred for the generator to generate a sequence of random numbers. In actual fact, quite generally a stream of random numbers is generated which, depending on the reaching of a specific region in the wave course of the second signal, in each case supplies a number, or a digit of a number. By way of example, it is possible to configure the generator such that it generates binary numbers including zeros and ones, and to combine in each case a predetermined number of these binary values to form an overall random number. Thus, it is possible, for example, to combine 16 or 32 binary numbers to form a suitable random number of 16 or 32 bits.

As already explained, the generator can include merely a flip-flop in a simple embodiment. However, this can have the effect, despite the measures according to the invention, that the generator provides a non-constant power during the random number generation, e.g. owing to the non-constant frequency of the second signal. Furthermore, the random number may be influenced toward a specific value, that is to say have an inherent weighting. It is therefore preferred for the generator furthermore to have an equalizing circuit for the compensation of a non-constant power and/or a weighting in the random number generation. If the second signal, which samples the first signal, also has a floating profile (i.e. a frequency that changes periodically between a minimum and a maximum value), then the power of the random number generator also changes with frequency. This can be compensated for by a preferred equalizing circuit which can be realized for example by a feedback shift register to which the output signals of the random number generator are fed. As is known, a shift register is an entropy storage. If signals, for example bits, are taken from the shift register at a constant rate which is less than or equal to the minimum output signal rate of the random number generator, then the signal stream taken (for example a bit stream) has an entropy which is greater than or equal to the entropy of the signal stream from the random number generator. However, other post-processing methods on circuits are also conceivable which serve to improve the quality of the random numbers generated.

In further preferred embodiments, the first and/or the second clock generator circuit may have at least one voltage-coupled oscillator and a further oscillator, whose signal output is connected to a control input of the voltage-coupled oscillator. This configuration, which is known in principle, although not in combination with the invention, enables a further improvement of the quality of the random numbers. The further oscillator may also be a voltage-coupled oscillator whose control input is connected to a constant voltage. In this way, the voltage-coupled oscillator acts like a simple oscillator which outputs only one frequency. When a voltage-coupled oscillator is used, the circuit can be simplified overall, since fewer different components or assemblies are required.

In order to further improve the quality of the random numbers generated, it may likewise be preferred for the first and/or the second clock generator circuit to have a plurality of series-connected voltage-coupled oscillators, the signal output of each of the voltage-coupled oscillators except for the last of the series being connected to the control input of the next voltage-coupled-oscillator. In this way, it is possible to obtain an even more complex frequency pattern in the first signal output, so that the periodicity of the sampling with the second signal increases further.

Other features which are considered as characteristic for the invention are set forth in the appended claims.

Although the invention is illustrated and described herein as embodied in a random number generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a random number generator having two clock generator circuits in accordance with a simple embodiment of the invention; and FIG. 2 is a block circuit diagram of a more complex clock generator circuit configuration according to the invention.

DESCRIPTION OF THE PREFERRED EMBODIMENTS

FIG. 1 generally shows an integrated circuit 1 having a first clock generator circuit 2 and a second clock generator circuit 13. The first clock generator circuit 2 has a clock generator 3 for the first signal and a voltage supply 4 for the first clock generator. In this example, the frequency of the first signal that is generated by the first clock generator circuit 2 is intended to be variable, so that the clock generator 3 for the first signal is, for example, a VCO to whose control input 10 an additional oscillator 5 of the first clock generator circuit 2 is connected, which additional oscillator supplies the control input 10 with a signal having a constant frequency via the signal output 9 and the signal line 8.

The second clock generator circuit 13 has a clock generator 14 for the second signal, which, in the present simpler exemplary embodiment, may be for example an oscillator having a constant frequency. The oscillator is supplied with a suitable operating voltage via the voltage supply 15 for the second clock generator and the voltage supply line 16. The first clock generator circuit 2 outputs via a signal output 11 for the first signal the signal which is fed to the random number generator via a signal line 12 for the first signal. The clock generator 14 for the second signal likewise outputs the second signal to the random number generator 19 via a signal output 17 for the second signal and a signal line 18. After the generation of random numbers, the random number generator 19 outputs random numbers via the random number output 22.

The first clock generator circuit 2 furthermore has a voltage supply 4, which supplies the clock generators with energy via voltage supply lines 6, 7. The second clock generator circuit 13 is provided with a second voltage supply, which supplies the clock generator 14 with energy via the voltage supply line 16.

According to the invention, the two clock generator circuits 2 and 13 are disposed such that they are spaced apart from one another as far as possible on the integrated circuit 1. This is ensured by the corresponding assemblies having been placed in diagonally opposite corners of the integrated circuit. If it is technically not possible in any other way, however, it is also possible to use other locations for the location of the clock generator circuits.

Furthermore, a guard ring according to the invention is placed around each of the two clock generator circuits. In the following example, a p-doped or an n-doped guard ring 20 is placed around the clock generator circuit 2 for the first signal, while an identically doped guard ring 21 is placed around the second clock generator circuit 13.

Finally, according to the invention, the two voltage supplies 4 and 15 can be isolated from one another by the measures explained above, such as RC elements and/or a voltage regulator which are only schematically indicated in the drawings.

FIG. 2 shows a more complex exemplary embodiment of the present invention. In this case, the first clock generator circuit 2 has a total of three VCOs, namely the clock generator for the first signal 3, the second VCO 23 for the first signal and the third VCO 24 for the first signal, which are all supplied with voltage by the voltage supply 4 via the voltage supply line 6, 7.

The third VCO 24 outputs, via a signal output 30 of the third VCO 24 and a signal line 29, a signal having a constant frequency to the control input 31 of the second VCO 23, which thereupon outputs, at the signal output 9, a signal having a variable frequency to the control input 10 of the first clock generator 3 via the signal line 8. The first clock generator thus generates a more complex signal which is forwarded to the random number generator 19, as described above. The random number generator 19 has an equalizing circuit 32 with a linear feedback shift register. In the present exemplary embodiment, the same configuration is also used for the generation of the second signal. In this case, the three VCOs 25, 26 and 27 are used, which are supplied with energy via the voltage supply line 16 and 28.

The random number generator disposed according to the invention makes it possible to generate random numbers of considerably better quality than was possible with previously known circuits. The surprising simplicity of the solutions proposed enables a more cost-effective realization in the concrete implementation of random number generators according to the invention.

I claim:

1. A circuit configuration, comprising:
an integrated circuit;
a random number generator configuration provided on said integrated circuit;
said random number generator configuration including a first clock generator circuit for generating a first signal having one of a first frequency and a first frequency range with a first mean value, and said random number generator configuration including a second clock generator circuit for generating a second signal having one of a second frequency and a second frequency range with a second mean value, said first and second clock generator circuits generating said first and second signals such that one of said second frequency and said second mean value is smaller than one of said first frequency and said first mean value;
said first clock generator circuit having a first voltage supply, said second clock generator circuit having a second voltage supply;
said random number generator configuration including a generator configured to sample said first signal with said second signal and configured to generate at least one random number in dependence of a sampling result; and
said first clock generator circuit and said second clock generator circuit being spaced apart from one another by a maximum spacing distance on said integrated circuit, and said first voltage supply and said second voltage supply being isolated from one another.

2. The circuit configuration according to claim 1, wherein:
said integrated circuit has diagonally opposite corner regions; and
said first and second clock generator circuits are respectively disposed in said diagonally opposite corner regions of said integrated circuit.

3. The circuit configuration according to claim 1, including at least one RC element, said first and second voltage supplies being isolated by said at least one RC element.

4. The circuit configuration according to claim 1, including two RC elements, each of said first and second voltage supplies being isolated by a respective one of said RC elements.

5. The circuit configuration according to claim 1, including an RC element for isolating said first clock generator circuit, said RC element having a decoupling frequency corresponding to one of said second frequency and said second mean value of said second frequency range of said second signal of said second clock generator circuit.

6. The circuit configuration according to claim 1, including an RC element for isolating said second clock generator circuit, said RC element having a decoupling frequency corresponding to one of said first frequency and said first mean value of said first frequency range of said first signal of said first clock generator circuit.

7. The circuit configuration according to claim 1, including at least one voltage regulator, said first and second voltage supplies being isolated by said at least one voltage regulator.

8. The circuit-configuration according to claim 1, wherein said first clock generator circuit generates a signal with a variable frequency as said first signal.

9. The circuit configuration according to claim 1, wherein said second clock generator circuit generates a signal with a variable frequency as said second signal.

10. The circuit configuration according to claim 1, wherein said first and second clock generator circuits generate said first and second signals such that said second signal has a frequency at least ten times lower than said first signal.

11. The circuit configuration according to claim 10, wherein said first and second clock generator circuits generate said first and second signals such that said second signal has a frequency at least one hundred times lower than said first signal.

12. The circuit configuration according to claim 1, wherein said generator generates a sequence of random numbers.

13. The circuit configuration according to claim 1, wherein said generator includes an equalizing circuit for compensating a non-constant power.

14. The circuit configuration according to claim 1, wherein said generator includes an equalizing circuit for providing a weighting during a random number generation.

15. The circuit configuration according to claim 1, wherein said generator includes an equalizing circuit with a linear feedback shift register.

16. A circuit configuration, comprising:

an integrated circuit;

a random number generator configuration provided on said integrated circuit;

said random number generator configuration including a first clock generator circuit for generating a first signal having one of a first frequency and a first frequency range with a first mean value, and said random number generator configuration including a second clock generator circuit for generating a second signal having one of a second frequency and a second frequency range with a second mean value, said first and second clock generator circuits generating said first and second signals such that one of said second frequency and said second mean value is smaller than one of said first frequency and said first mean value;

said first clock generator circuit having a first voltage supply, said second clock generator circuit having a second voltage supply;

said random number generator configuration including a generator configured to sample said first signal with said second signal and configured to generate at least one random number in dependence of a sampling result;

said random number generator configuration having at least one isolation measure selected from the group consisting of said first and second generator circuits being spaced apart from one another by a maximum spacing distance on said integrated circuit, said first and second voltage supplies being isolated from one another, and at least one guard ring being placed around each of said first and second clock generator circuits;

at least one of said first and second clock generator circuits having at least one voltage-coupled oscillator and a further oscillator; and said at least one voltage-coupled oscillator having a control input, said further oscillator having a signal output connected to said control input of said at least one voltage-coupled oscillator.

17. The circuit configuration according to claim 16, wherein said further oscillator is a voltage-coupled oscillator having a control input supplied with a constant voltage.

18. The circuit configuration according to claim 16, wherein at least one of said first and second clock generator circuits has a plurality of voltage-coupled oscillators connected in series to one another such that each of said voltage-coupled oscillators, except for a last one of said voltage-coupled oscillators, has a control output connected to a control input of a respective next one of said voltage-coupled oscillators.

19. The circuit configuration according to claim 1, including:

at least one guard ring placed around said first clock generator circuit; and at least one guard ring placed around said second clock generator circuit.

* * * * *

UNITED STATES PATENT AND TRADEMARK OFFICE
CERTIFICATE OF CORRECTION

PATENT NO. : 6,667,665 B2
DATED : December 23, 2003
INVENTOR(S) : Norbert Janssen It is certified that error appears in the above-identified patent and that said Letters Patent is hereby corrected as shown below:

<u>Title page,</u>
Item [73], Assignee, should read as follows:
-- Infineon Technologies AG, Munich (DE) --

Signed and Sealed this

Twenty-third Day of March, 2004

JON W. DUDAS
*Acting Director of the United States Patent and Trademark Office*